United States Patent Office 3,511,833
Patented May 12, 1970

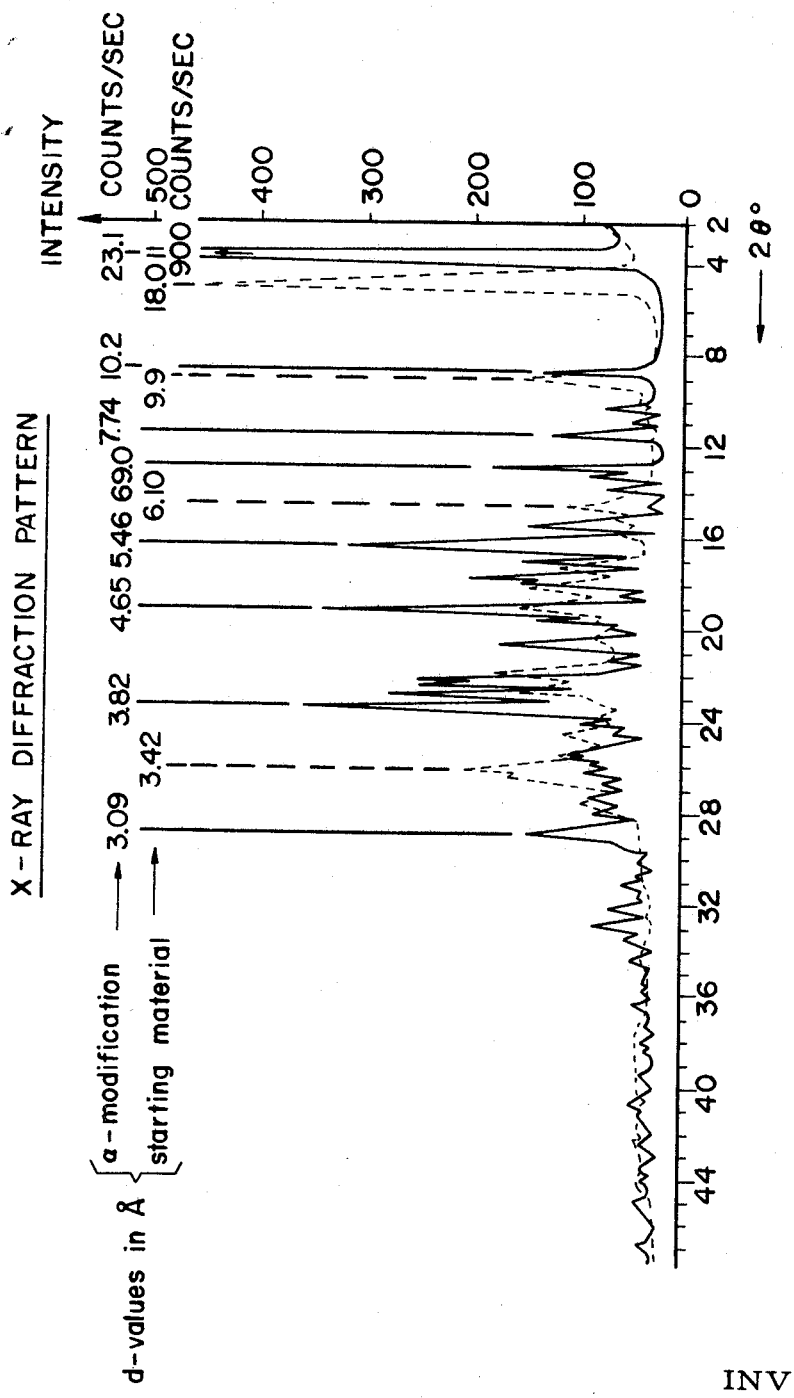
INVENTOR
Christopher J. Tscharner

3,511,833
PROCESS FOR MAKING A NEW CRYSTALLINE FORM OF A BIS-TRIAZINYLAMINO STILBENE OPTICAL BRIGHTENER
Christopher J. Tscharner, Warwick, R.I., assignor to Geigy Chemical Corporation, Ardsley, N.Y., a corporation of New York
Filed May 12, 1967, Ser. No. 638,066
Int. Cl. C07d 55/22
U.S. Cl. 260—240                   12 Claims

ABSTRACT OF THE DISCLOSURE

The thermostable α-crystal form of the optical brightener, the disodium salt of 4,4'-bis-[2"-phenylamino-4"-(N-methyl - β - hydroxy - ethylamino)-s-triazinyl(6")-amino]-stilbene-2,2'-disulfonic acid, is produced by converting thermally instable forms of the above-named optical brightener to thermostable sodium salts by heating at reflux temperature the thermally instable forms in a reaction medium comprising an inert, water-soluble organic solvent and an aqueous solution of an electrolyte in certain critical amounts.

BACKGROUND OF THE INVENTION

Field of the invention

This invention relates to the preparation of a thermostable 4,4'-bis-triazinyl-stilbene optical brightener. More particularly, this invention pertains to a novel process for making a thermostable α-crystal form of a disodium 4,4'-bis - (phenylamino-N-methyl-β-hydroxyethylamino-s-triazinylamino)-stilbene disulfonate by heating at reflux temperature thermally instable forms in a reaction medium comprising an inert, water-soluble organic solvent and an aqueous electrolyte solution of sodium salts of inorganic or organic acids.

Description of prior art

The use of N,N'-bis-triazinyl derivatives of 4,4'-diaminostilbene-2,2'-disulfonic acid for the brightening of cellulose and polyamide substrates has been known for a considerable time and has been greatly extended for the optical brightening of textile material. This optical brightening is performed today not only by the textile producer or finisher but, to an increasing extent, also by the housewife who washes her laundry with washing agents which contain optical brighteners. In order to increase the brightening effect, the suitable optical brighteners are incorporated into the washing agents during their production. The goal of producing washing agents which impart to laundry (wash load) a whiter and whiter aspect has made it necessary for the producers of such washing agents to constantly increase the amounts of brightener in their products. However, the relatively high contents of 2 to 5 kg. of brightener per ton of washing agent, which has lately been used by many producers, causes often a distinct discoloration of the washing powder. This undesirable discoloration often increases when these powders are stored in a damp atmosphere. The freedom from discoloration of the washing powder itself during the several stages of manufacture is used by the producers as a check that the production steps proceed as desired. This manufacturing control is made difficult or impossible if the admixture of optical brightener leads to discoloration of the entire product during its manufacture.

In U.S. Pat No. 2,762,801 optical brighteners are described which, because of good affinity to cellulose fibers in a wide temperature range, are particularly suitable for use in washing liquors. An excellent, typical representative of this group is the disodium salt of 4,4'-bis-[2" - phenylamino-4"-(N-methyl-β-hydroxyethylamino)-s-triazinyl-(6")-amino]-stilbene-2,2'-disulfonic acid. This group of valuable optical brighteners for washing agents, when used in a high concentration, exhibits the disadvantageous discoloration of the washing powder mentioned above to a particularly marked degree. For instance, if these products are incorporated in amounts of 3 kg. and more, in the usual way, into 1000 kg. of washing powder, then these washing agents have an undesirable yellowish to yellow color which becomes even deeper on storing when exposed to humidity in the air.

It is known from the French Pat. No. 1,361,065 that the dialkali salts of 4,4'-bis-[2"',4"'-diphenylamino-s-triazinyl-(6")-amino]-stilbene-2,2'-disulfonic acid, which can also be used as optical brighteners in washing agents, can be converted into a more stable crystal form by heating at a relatively high temperature (100–200°) and under a correspondingly high pressure (5–225 lbs. p.s.i.) in the presence of alkaline substances. Specifically, this French patent teaches that the preferred conversion temperature lies above 145° and that inorganic salts prevent the formation of the new crystal form and thus are to be removed before the operation.

There are mainly two reasons why it could not have been foreseen that the process according to the present invention would lead to a stable crystal form. From the state of the art as mentioned above, it was to have been expected that inorganic salts such as sodium chloride would prevent the production of a stable crystal form. The present invention has shown, however, that in this case, electrolytes are actually necessary for the crystal conversion. The French Pat. No. 1,361,065 also teaches that the conversion is advantageously performed at temperatures of over 145° C. and correspondingly high pressures. It was, therefore, to have been expected that the production of stable crystals of products of Formula I would also be facilitated at such temperatures and pressures. That the conversion can well be made at substantially lower temperatures, i.e. at temperatures below 100° C. and without pressure is surprising, especially since the above-mentioned dialkali salts in the new crystal form covered in French Pat. No. 1,361,065 cannot be produced at all at temperatures below 100° C. Working at lower temperatures means that no costly pressure apparatus is necessary and that there is a higher batch capacity.

DETAILED DISCLOSURE

A new crystal form which is thermostable in the above-described uses is obtained in accordance with this invention when an instable form such as is obtained under normal production conditions, of Formula I:

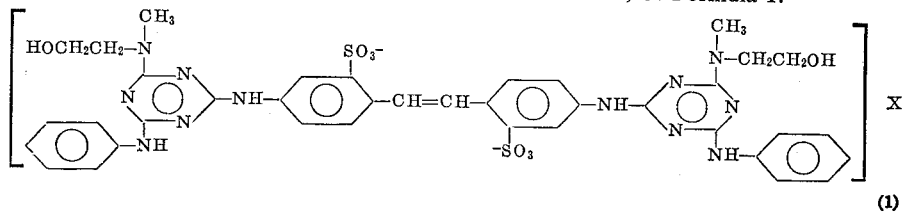

(1)

wherein X represents two monovalent cations or one divalent cation, is heated in a batch or continuous operation at reflux temperature in a reaction medium comprising an inert organic solvent and an aqueous electrolyte solution of sodium salts of inorganic or organic acids, the concentration of said sodium salts in said electrolyte solution being of sufficient amount to prevent the dissolution of the salt of Formula I, optionally in the presence of alkaline substances and seed crystals, and, on completion of the conversion, the stable disodium salt, which is characterized by a definite crystal lattice, of Formula II:

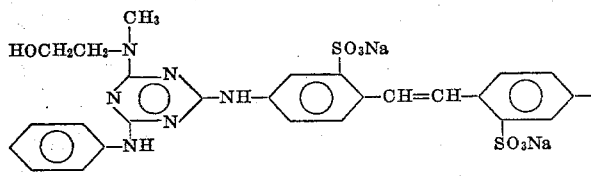 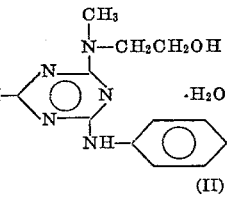

(II)

is isolated. The thermostable crystal form so obtained is termed the α-form hereinbelow.

The above-mentioned instable forms of a salt of the anionic optical brightener of Formula I are forms which are (1) either crystals which are not thermostable or (2) are insufficiently crystalline to begin with; i.e. the crystallites or grains of such forms do not show any distinct, but at best diffuse, diffraction lines in their X-ray diffraction patterns, which latter can be obtained by the well-known powder technique using a Geiger counter or Proportional counter or the like instrument to record the intensity of the diffracted rays.

The compound of Formula I used as starting material can be produced by known methods such as those described in U.S. Pat. No. 2,762,801. For example, first one mol of 4,4'-diaminostilbene-2,2'-disulfonic acid and 2 mols of cyanuric chloride are reacted at −10° to +10° C., the intermediate product formed is then reacted at 0–30° C. with 2 mols of aniline, and finally, the remaining two chlorine atoms in the 4,4'-bis-[2''-phenylamino - 4'' - chloro-s-triazinyl-(6'')-amino]-stilbene-2,2'-disulfonic acid so formed are exchanged for N-methylethanolamine radicals by heating the reaction mixture at 50–90° with excess amine. The reaction product is then generally isolated as a dialkali salt, preferably the disodium salt. Produced under the usual conditions, depending on the method of isolation such as salting out with different salts or bases such as NaCl, Na₂CO₃, NaOH, NH₄Cl, precipitation with an acid and conversion of the inner salt obtained into another salt by treatment with a base, and also depending on the degree of drying, these products have different crystal structures which, however, are not thermostable, i.e. on heating to a higher temperature, e.g. to above 80–100° C., they lose built-in water or solvent molecules and change into a more or less strongly yellow colored powder the texture of which as determined in the Philips Proportional counter goniometer may even have partly X-ray amorphous character.

Preferably the sodium or the inorganic or an organic ammonium cation is used as cation in Formula I. Such ammonium cation is preferably of the formula

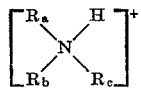

wherein each of $R_a$, $R_b$ and $R_c$ is hydrogen, lower alkyl, hydroxy lower alkyl, or two of these R's taken together form a polymethylene chain of from 4 to 6 —CH₂- members one of which may be replaced by an oxygen atom. When "cation" therein represents a divalent cation such as magnesium or calcium, use of a sequestering agent in the mixture is mandatory. The qualifying term "lower" as used throughout this application in connection with such terms as alkyl, alkanol, etc. means that the groups or compounds in question have from 1–5 carbon atoms.

The stilbene compound used as starting compound can optionally be used in the form of the free sulfonic acid or of its inner salt with the addition of of bases in an amount sufficient for the desired salt formation.

As organic solvent which constitutes part of the reaction medium in the process of this invention and which is at least partly water-soluble and insert was respect to the reactant, a lower alkanol or a lower alkyl ketone can be employed. For instance, operative examples of lower alkanols are ethanol, isopropanol and especially n-butanol and operative examples of lower alkyl ketones are acetone, methylethyl ketone, methyl-n-propyl ketone, methylisopropyl ketone, diethyl ketone, etc. Particularly preferred is methylethyl ketone (MEK).

The ratio of organic solvent to water in the reaction medium should be within the range of 5–50% of solvent to 95–50% of water and more preferably within the range of 15–35% of solvent to 85–65% of water.

Mainly the halides such as chloride, bromide or iodide, and the sulfate as well as the salts of lower aliphatic, especially saturated unsubstituted or hydroxyl-substituted hydrocarbon carboxylic acids, but preferably lower fatty acids such as lower alkanoates, e.g. the formiate and acetate are used as sodium salts of inorganic and organic acids, with the help of which the conversion into the crystal modification is performed.

Preferably, these electrolytes are used as at least 2.5 N solutions; the upper concentration limit is their saturation. The concentration of sodium salt dissolved in the electrolyte in the reaction mixture should be sufficient to prevent the salt of Formulat I from dissolving in the mixture, and should preferably be so great that there are at least 2 gram-ions of sodium to 1 mol of stilbene compound to be converted, i.e. that the conversion takes place at pH which is at least about 7. In any event, the solubility rate of the electrolyte in the reaction mixture must be high enough so that sufficient amount thereof dissolves in the mixture to prevent the compound of Formula I from dissolving therein. So that the reaction mixture can still be well, it is advantageous to use at least 2 parts by volume of electrolyte solution to 1 part of stilbene compound.

The reaction time depends on the temperature applied and may range from a few minutes to 24 hours, but should be interrupted as soon at the conversion of the brightener to the thermostable crystal form is complete as can be readily determined by control samples.

In converting the compound of Formula I into the thermostable α-crystal form by means of solvent media containing the mentioned electrolyte solutions, advantageously an alkaline substance is added to the mixture. This addition of base is mainly indicated when an ammonium salt is used as starting material and it is necessary when the free acid is used so that the reaction takes place in a medium the pH of which is preferably at least about 7. In addition, the base added protects the apparatus from corrosion.

Alkaline additives can be both inorganic as well as organic compounds, e.g. alkali hydroxides such as NaOH or KOH; alkali cyanides such as sodium or potassium cyanide; alkali carbonates such as sodium or potassium carbonate; alkali phosphates; ammonia; organic bases such as mono-, di- and tri-ethanolamine, mono-, di- and tri-isopropanolamine, methylamine, diethylamine, tripropylamine, N-methyldiethanolamine, pyrrolidine, piperidine and morpholine, as well as their N-alkyl derivatives.

The conversion product isolated, e.g. by filtration, is advantageously washed with water and/or a salt solution, e.g. with a 5–15% solution of sodium chloride or the sodium salt used for the reaction. Care should be taken, however, not to partially dissolve the final product as this would again cause a yellow discoloration of the product because of reconversion to a yellow instable form on drying.

The new α-crystal form of the compounds of Formula II is distinguished by good stability to heat. Thus, for example, the α-form obtained according to the present process of the disodium salt of 4,4'-bis-[2''-phenylamino-4''-(N-methyl - β - hydroxyethylamino)-s-triazinyl-(6'')-amino]-stilbene-2,2'-disulfonic acid containing 1 mol of crystal water, which is particularly effective as a cellulose brightener, is stable up towards 200° C.

Throughout this application, the new α-crystal form of the stilbene derivative according to the invention as defined above is termed thermostable because it is thermostable up to at least 150° C., and, during and after incorporation into a moist washing agent containing sodium ions it is not converted into a yellow-colored form. It has been found that a dozen different crystal forms of the disodium salt of 4,4'-bis-[2''-phenylamino-4''-(N-methyl-β-hydroxyethylamino)-s-triazinyl - (6'')-amino]-stilbene-2,2'-disulfonic acid prepared only the above α-form possesses this thermostability.

The new α-crystal form can best be characterized by an X-ray diagram. The X-ray patterns shown in the accompanying FIG. I were obtained by the well-known powder technique described, for instance, by Klug and Alexander in "X-ray Diffraction Procedures for Polycrystalline and Amorphous Materials," published by John Wiley and Sons, New York, N.Y. (1954) especially p. 235 et seq., using a Proportional counter-equipped goniometer made by N. V. Philips Gloeilampen-fabrieken, Eindhover, Netherlands. The instrument actually records the intensity of the diffracted ray on the vertical axis versus the angle of diffraction on the horizontal axis with $CuK_\alpha$ radiation, and then this angle is converted to interplanar spacing expressed in angstrom units. The values given are accurate to within 2 percent and in most cases, particularly with d-values of less than 10 A., variation is less than 1%. Therefore, this variance should be taken into account when interpreting the specification and the appended claims.

The crystalline α-form of the compound of Formula II has the form of needles, prisms or platelets and is characterized by an X-ray diffraction diagram having the following characteristic lines: a very strong line at 23.1 A., three strong lines at 5.46 A., 4.65 A. and 3.82 A., as well as four fairly strong lines at 10.2 A., 7.74 A., 6.90 A. and 3.09 A., as shown in the accompanying diagram.

An X-ray diagram was also taken of the instable starting material which is characterized by a very strong line at 18.0 A. and three fairly strong lines at 9.9 A., 6.16 A. and 3.42 A.

Solid detergents, including soaps and the like compositions to which the thermostable optical brightener according to the invention can be added at any step of their production are, more particularly, anionic detergents such as alkali metal salts of alkyl-aryl-sulfonates, especially alkyl-benzene and alkyl-naphthalene sulfonates, alkali metal salts of sulfates of higher fatty alcohols, or alkali metal salts of higher fatty acids, in which the cation portion consists preponderantly of sodium ions.

The following examples illustrate the invention without limiting it in any way. The temperatures are given in degrees centigrade.

EXAMPLE 1

Ten grams of the yellow, thermally instable, partially crystalline disodium salt of 4,4'-bis-[2''-phenylamino-4''-(N-methyl - β - hydroxyethylamino) - s - triazinyl-(6'')-amino]-stilbene-2,2'-disulfonic acid, prepared in accordance with the prior art, is suspended in a solution of 60 g. of sodium nitrate in 100 cc. of water. Then 0.6 g. of triethanolamine and 5 cc. of butanol are added and the reaction mixture is heated to a temperature of 80° while stirring. At this temperature, the reaction mixture is seeded with 0.5 g. of the α-crystal form obtained as described in patent application Ser. No. 638,065, filed concurrently herewith in the names of H. Hausermann, H. Schlapfer and C. Tscharner, and the mixture is stirred at a temperature of 75 to 80° for another 24 hours. The white suspension which is then obtained is filtered, the residue washed with a 10% aqueous sodium chloride solution until the wash solution is free of nitrate ions and dried in vacuum at a temperature of 60 to 70°. An almost white powder containing the thermostable α-crystal form besides some sodium chloride is obtained.

EXAMPLE 2

In a 1500 cc. flask equipped with a stirrer, condenser and distillation receiver, there is placed about 400 cc. of water (total of 700 cc., minus water content of the wet starting material) and 175 g. of sodium chloride. 180 g. (0.2 mole) of the starting material, the disodium salt of 4,4'-bis-[2''-phenylamino-4''-(N-methyl - β - hydroxyethylamino)-s-triazinyl - (6'') - amino]-stilbene-2,2'-disulfonic acid, yellow, 100% (M. 900), produced according to the prior art, is added as wet cake (about 480 g.), 180 g. of 100% acetone is poured in, the reaction mixture is adjusted to a pH of 8.5 to 10.0 and the suspension obtained is heated to a temperature of 60 to 62° under reflux. About 0.2 g. of the thermostable α-crystal form is added as seed crystals and the mixture is kept at a temperature of 60 to 62° for another two hours. At this time, the product is completely converted to the desired white α-crystal form. From the reaction mixture having a total volume of about 1150 cc., a mixture of acetone and water is then distilled off beginning at an inner temperature of 62° and ending at a temperature of 103 to 104°. The residue is cooled down to a temperature of 30 to 40°, filtered and dried in a vacuum at 80 to 120°. The yield is ca. 220 g. dry as is 82%=ca. 180 g. 100%. 200–210 g. of 80% acetone=ca. 164 g. 100% is recovered.

EXAMPLE 3

The procedure given in Example 2 is repeated except that 100 g. of n-butanol (100%) is used and the suspension is heated to 85–90° and after addition of the seed crystals the temperature is kept at 90–92° (weak reflux).

If in this example, n-butanol is replaced with isopropanol an equivalent procedure is obtained yielding also the α-crystal form.

EXAMPLE 4

A reaction mixture is heated to reflux for 5 minutes, 80 g. of sodium chloride is added thereto and heating at reflux is continued for 15 minutes. This reaction mixture is obtained in accordance with the following procedure:

Into a 2 liter flask equipped with agitator, electrode, control thermometer and reflux condenser and charging funnel 375 g. of chopped ice and 300 g. of methyl ethyl ketone (MEK) are added and mixed. The temperature falls to −7°. Then 50 g. of cyanuric chloride (0.271 mole) and with good agitation 50 g. of diamino-stilbenedisulfonic acid (DAS) dry powder 100% (0.135 mole) are added. Without delay and with effective mixing throughout 28.8 g. of sodium carbonate 100% (0.271 mole) as approximately 195 ml. of a 15% solution is added within about 30–40 minutes at a pH of 3–4 at the beginning and pH 5–6 at the end of the addition. An ice bath is used to keep the temperature at maximum +5°. A trace to light test for free DAS is obtained with R-acid. An easily stirrable tan-yellow homogeneous slurry is obtained.

The temperature is then allowed to reach 20° and 25.2 g. of aniline (0.271 mole) is added in 5 minutes. The pH is being adjusted with 22 g. of 50% sodium hydroxide (0.275 mole) to pH 8–8.5. (At the beginning of the 50% sodium hydroxide addition the pH is about 4–5.) This aniline condensation takes about 15–20 minutes until the pH is stable and the theoretical amount of 50% sodium hydroxide is added. The condensation is exothermic and a temperature of ca. 27–30° is obtained. A negative to 700 g. of water, 300 g. of MEK, and a mixture of 175 g. of sodium acetate and 10 g. of sodium carbonate were used. Yield: 122 g. of light yellowish α-form product.

What is claimed is:

1. A process for the production of a thermostable crystal form of a bis-trizainylamino-stilbene derivative which comprises:

heating at reflux temperatures a thermally instable form of the compound of the formula

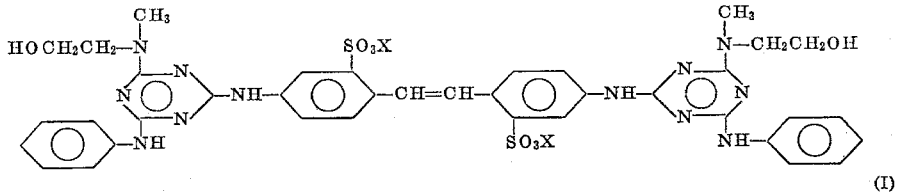

(I)

trace test for free aniline is obtained with R-acid after finishing the pH adjustments. A yellow, light homogeneous slurry is obtained.

The reaction mixture is then heated to 50°. 22.9 g. (0.305 mole) of N-methylethanolamine is added all at once and heating to reflux is started. An initial pH of ca. 10 (10–12 narrow range pHydrion paper) is obtained which decreases rapidly. The pH during this reaction is adjusted with approximately 24.5 g. of 50% sodium hydroxide (0.306 mole) to 10–11 (10–12 narrow range pHydrion paper). This gives the reaction mixture mentioned in the beginning of this example.

Starting at 73° MEK is slowly stripped off. At 75° a viscous reaction mass is obtained, which starts to break up during a 1 hour holding period at this temperature. A light yellowish product is obtained. After all the MEK is removed at 100° a sandy light product is obtained. 400 ml. of MEK/water are removed. The product is cooled to 30° and filtered and sucked dry. Then the product is dried at 100° in a vacuum oven. Yield of α-form product: 130–135 g.; optical strength: 145–156%; NaCl content: 7–10; $H_2O$ 2.5%.

If for the conversion 130 g. of sodium chloride are used wherein X represents an alkali metal ion or an ammonium ion of the formula $$\left[\begin{array}{c} R_a \quad H \\ N \\ R_b \quad R_c \end{array}\right]^+$$

wherein each of $R_a$, $R_b$ and $R_c$ represents hydrogen, lower alkyl, or hydroxy-lower alkyl, or $R_a$ and $R_b$ when taken together with the nitrogen atom to which they are linked represent pyrrolidino, piperidino or morpholino, in a reaction medium consisting essentially of an inert water-soluble organic solvent and an aqueous solution of an electrolyte of the class consisting of water-soluble, sodium salt of a mineral acid and the water-soluble sodium salt of a lower aliphatic saturated unsubstituted or hydroxyl-substituted hydrocarbon mono- or dicarboxylic acid, or mixtures thereof, the concentration of said sodium salt in said electrolyte being sufficient to prevent the compound of Formula I from dissolving in the electrolyte solution, maintaining the reaction mixture at such reflux temperatures until said thermally instable form is converted to the thermostable form of a compound of the formula

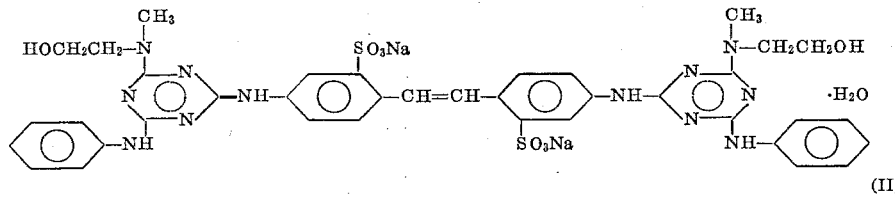

(II)

in order to obtain a saturated solution, the reaction mixture is seeded with α-form crystals and seeding is kept up during stripping especially when the product starts to form lumps.

EXAMPLE 5

To a reaction flask 500 ml. of water and 50 g. of 4,4'-bis-[2''-phenylamino - 4'' - (N-methyl-β-hydroxyethylamino)-s-triazinyl-(6'')-amino]-stilbene - 2,2' - disulfonic acid are charged and the reaction mixture is heated to 70–75° while 50% sodium hydroxide is added to obtain a pH of 12. The reaction mixture is held at 70–75° and at the pH of 12 for 10–15 minutes in order to obtain a solution. Then 100 g. of sodium chloride is added to the reaction mixture which is agitated for 30 minutes and then cooled to 70°. Then 250 ml. of MEK is added as well as seed crystals and stripping of the MEK/water mixture is started. When crystallization starts, the reaction mixture is refluxed for 15 to 20 minutes. Stripping of MEK is continued until a temperature of 99–100° is obtained. Then the reaction mixture is cooled to 85° and filtered and the desired α-form product is dried at 85°.

EXAMPLE 6

Following the procedure described in Example 5, 120 g. of the disodium salt of the mentioned disulfonic acid, and recovering said thermostable form from the reaction mixture.

2. A process as described in claim 1, wherein said solvent is selected from among lower alkyl ketones and lower alkanols.

3. A process as described in claim 1, wherein said solvent is methyl ethyl ketone.

4. A process as described in claim 1, wherein the normality of the electrolyte is at least about 2.5.

5. A process as defined in claim 1, wherein said electrolyte is a sodium halide.

6. A process as described in claim 1, wherein said electrolyte is sodium chloride.

7. A process as described in claim 1, wherein X in Formula I represents sodium.

8. A process as described in claim 1 wherein the conversion from a thermally instable to a thermostable form is aided by introduction of thermostable seed crystals to the reaction mixture.

9. A process as described in claim 1, wherein the conversion from a thermally instable to a thermostable form is aided by introduction of alkaline substances to the reaction mixture.

10. A process as described in claim 1, wherein the reaction mixture is maintained at a pH of about 7 or higher.

11. A process as described in claim 1, wherein the ratio of organic solvent to water in the reaction medium is within the range of 5 to 50% of solvent to 95 to 50% of water.

12. A process as described in claim 1, wherein the ratio of organic solvent to water in the reaction medium is within the range of 15 to 35% of solvent to 85 to 65% of water.

References Cited

UNITED STATES PATENTS 2,762,801  9/1956  Hausermann ____ 260—240 XR

FOREIGN PATENTS 1,361,065  4/1964  France.

OTHER REFERENCES

Weissberger, Technique of Organic Chemistry, 2nd ed., vol. 3, part I, pp. 398 to 399, Interscience Publishers, Inc. N.Y. (1956).

JOHN D. RANDOLPH, Primary Examiner

U.S. Cl. X.R.

252—152